US 6,734,634 B2

(12) United States Patent
Kim

(10) Patent No.: US 6,734,634 B2
(45) Date of Patent: May 11, 2004

(54) CONTROL SYSTEM FOR DAYTIME RUNNING LIGHTS

(75) Inventor: Hyoung-Uk Kim, Ansan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/235,605

(22) Filed: Sep. 4, 2002

(65) Prior Publication Data

US 2003/0057843 A1 Mar. 27, 2003

(30) Foreign Application Priority Data

Sep. 11, 2001 (KR) .......................... 2001-55873

(51) Int. Cl.[7] ................................................ B60G 1/02
(52) U.S. Cl. ........................ 315/82; 315/83; 307/10.1
(58) Field of Search .......................... 315/82, 83, 77, 315/90, 308; 307/10.1, 10.8; 362/61, 802, 62

(56) References Cited

U.S. PATENT DOCUMENTS 5,081,565 A * 1/1992 Nabha et al. .................. 362/61
5,780,974 A * 7/1998 Pabla et al. .................... 315/82
5,912,534 A * 6/1999 Benedict ........................ 315/82

FOREIGN PATENT DOCUMENTS

KR    1019970000849    1/1997

* cited by examiner

Primary Examiner—James Clinger
Assistant Examiner—Jimmy T. Vu
(74) Attorney, Agent, or Firm—Morgan Lewis & Bockius LLP

(57) ABSTRACT

A control system for daytime running lights (DRLs) is provided that includes a controller for controlling DRLs according to whether the ignition switch is ON and information from the dimmer switch signal of a combination switch, and a plurality of switches that undergo switching according to signals of the controller. Accordingly, if the combination switch is set to activate the DRL system when the ignition switch is ON, a closed loop is formed with both headlights, and the current available to each headlight from the battery is reduced to one half of what it would be if loops were made independently for each of the headlights. When the dimmer switch is selected to high beam, a separate loop is made for each headlight so that a normal amount of current is available to the headlights.

6 Claims, 1 Drawing Sheet

CONTROL SYSTEM FOR DAYTIME RUNNING LIGHTS

FIELD OF THE INVENTION

The present invention relates to a headlight system for vehicles, and more particularly, to a daytime running light (DRL) system in which intensity of DRLs may be controlled.

BACKGROUND OF THE INVENTION

A headlight system for vehicles is generally used during nighttime driving or when the ambient light is low, to provide illumination of the road and of other vehicles to the driver, and also to enable drivers of other vehicles to view the vehicle. The headlight system is normally activated at dusk. It is also frequently used in bad weather such as when it is raining or snowing, again both for better illumination of the road and other vehicles, and to allow the drivers of other vehicles to view the vehicle.

For many countries located in far northern latitudes such as the Scandinavian countries and Canada, DRL laws have been enacted in an effort to reduce the number of accidents. That is, the DRL laws make necessary the illumination of the headlights during daytime hours (in the case of Canada, only vehicles manufactured since 1989 must comply with this law). The DRLs operate such that the headlights are automatically turned on at a predetermined brightness during the day.

In the case of the Scandinavian countries, the low beams are used as the DRLs, but in Canada the high beams are used since the headlights will last far less time if the low beams are used both during the day and at night. However, with the use of high beams, glare becomes a significant problem to drivers in oncoming traffic and to vehicles in front of the vehicle using the DRLs. Accordingly, a method has been employed in which 1.6 to 2.0 ohm($\Omega$) resistors are used to reduce the amount of current supplied to the headlights, thereby lowering the intensity of the high beams.

However, during operation to reduce the intensity of the high beams, heat is generated by the resistors. This may damage elements in close proximity to the resistors. Also, the generation of heat by the resistors makes resistor layout design in the compactly formed DRL system difficult.

SUMMARY OF THE INVENTION

In a preferred embodiment of the present invention current applied to headlights in a daytime running light (DRL) system (headlights as referred to herein are to be understood as being high beam headlights) is controlled to limit the intensity of the headlights using a current loop structure that utilizes a transistor array.

In one embodiment, the present invention provides a control system for daytime running lights including a controller for controlling DRLs according to whether the ignition is ON and information received from a combination switch, and a plurality of switches that are switched according to signals from the controller. Preferably the switches comprise four transistors. The first transistor has a collector terminal connected to the battery, an emitter terminal connected to a first of two terminals of a left headlight, and a base terminal connected to the controller. The second transistor has a collector terminal connected to a second terminal of the left headlight, an emitter terminal grounded, and a base terminal connected to the controller. The third transistor has a collector terminal connected to the second terminal of the left headlight, an emitter terminal connected to a first of two terminals of a right headlight (a second terminal of the right headlight being grounded), and a base terminal connected to the controller. The fourth transistor has a collector terminal connected to the battery, an emitter terminal connected to the first terminal of the right headlight, and a base terminal connected to the controller.

The controller, if it determines that DRL operational conditions are satisfied, forms a closed loop with the battery, the first transistor, the left headlight, the third transistor, the right headlight, and ground (preferably in this sequence) such that a current available to each headlight from the battery is reduced by one half as a result of the internal resistance of the right headlight and the left headlight. However, the controller, if it determines that conditions for operating high beams are satisfied, forms an independent loop with the battery, the first transistor, the left headlight, the second transistor, and ground (again, preferably in this sequence); and another independent loop with the battery, the fourth transistor, the right headlight, and ground (in this sequence), thereby supplying a current that is not reduced to the left and right headlights.

In another aspect of the present invention, a control system for daytime running lights includes a controller and a switch unit. The controller receives ON/OFF signals from the ignition switch and combination switch ON/OFF signals, and controls illumination intensity of left and right headlights according to the received signals. The switch unit is connected to the battery, the left and right headlights, and the controller. The switch unit varies current supplied to the left and right headlights from the battery according to control signals output from the controller.

In a preferred embodiment, the switch unit includes at least four transistors. The first transistor has a collector terminal connected to the battery, an emitter terminal connected to a first of two terminals of the left headlight, and a base terminal connected to the controller. The second transistor has a collector terminal connected to a second terminal of the left headlight, a grounded emitter terminal, and a base terminal connected to the controller. The third transistor has a collector terminal connected to the second terminal of the left headlight, an emitter terminal connected to a first of two terminals of the right headlight (a second terminal of the right headlight being grounded), and a base terminal connected to the controller. The fourth transistor has a collector terminal connected to the battery, an emitter terminal connected to the first terminal of the right headlight, and a base terminal connected to the controller.

When the ignition switch ON signal and the dimmer switch OFF signal are input to the controller, the controller performs control to operate the first transistor and the third transistor to ON, and the second transistor and the fourth transistor to OFF. When the ignition ON signal and the dimmer switch ON signal are input to the controller, the controller performs control to operate the first transistor, the second transistor, and the fourth transistor to ON, and the third transistor to OFF.

BRIEF DESCRIPTION OF THE DRAWINGS

The accompanying drawing, which is incorporated in and constitutes a part of the specification, illustrates an embodiment of the invention, and, together with the description, serves to explain the principles of the invention.

DETAILED DESCRIPTION OF THE PREFERRED EMBODIMENTS

Figure 1:
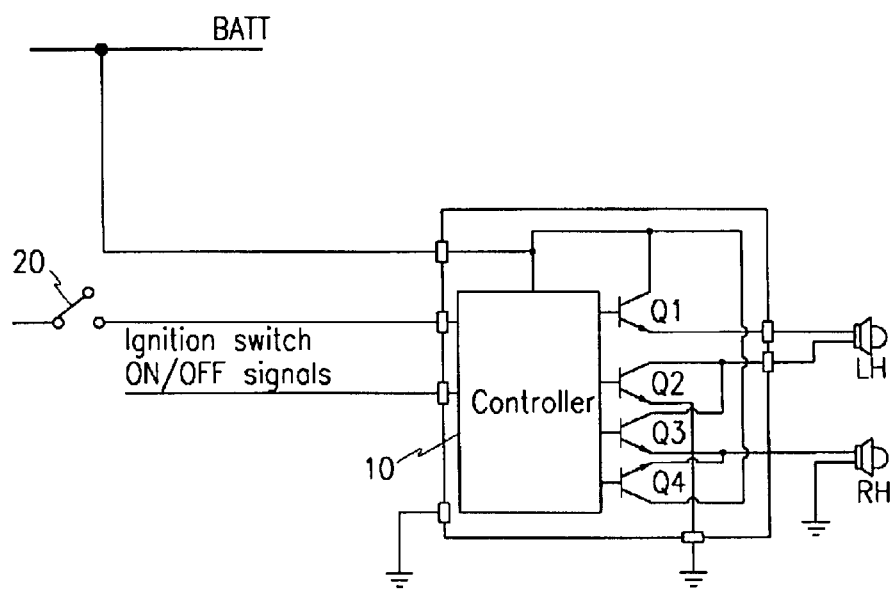
FIG. 1 is a schematic view of a daytime running light system according to a preferred embodiment of the present invention.

Preferred embodiments of the present invention will now be described in detail with reference to the accompanying drawing.

Referring to FIG. 1, a daytime running light (DRL) system according to a preferred embodiment of the present invention includes a controller 10, and first, second, third, and fourth transistors Q1, Q2, Q3, and Q4. The controller 10 preferably comprises a processor and associated hardware and software as may be selected by a person of ordinary skill in the art to execute the DRL control as described herein. The first to fourth transistors Q1 to Q4 undergo switching according to trigger signals applied to base terminals thereof from the controller 10. The controller 10 analyzes information regarding whether the ignition switch is ON and also analyzes a dimmer switch selection signal of a combination switch 20, then performs DRL operation or high beam ON control.

With respect to the first transistor Q1, a collector terminal of the first transistor Q1 is connected to a battery (BATT), and an emitter terminal of the first transistor Q1 is connected to a first of two terminals of a left headlight (LH). Through this connection, the first transistor Q1 controls the operation of the left headlight (LH) according to the trigger signals applied to the base terminal thereof. That is, the trigger signals output from the controller 10 perform switching of the first transistor Q1 is that the left headlight (LH) is controlled to ON and OFF states.

A collector terminal of the second transistor Q2 is connected to a second terminal of the left headlight (LH). Also, an emitter terminal of the second transistor Q2 is grounded, and the base terminal of the second transistor Q2 is connected to the controller 10 to undergo switching by the trigger signals applied therefrom.

A collector terminal of the third transistor Q3 is connected to the second terminal of the left headlight (LH). An emitter terminal of the third transistor Q3 is connected to a first of two terminals of a right headlight (RH), a second terminal of the right headlight (RH) being grounded. The base terminal of the third transistor Q3 is connected to the controller 10, and the trigger signals output by the controller 10 perform switching of the third transistor Q3 so that the right headlight (RH) is controlled to ON and OFF states.

A collector terminal of the fourth transistor Q4 is connected to the battery (BATT), and an emitter terminal of the fourth transistor Q4 is connected to the first terminal of the right headlight (RH). By the trigger signals applied to the base terminal of the fourth transistor Q4 from the controller 10, the fourth transistor Q4 undergoes switching to control the right headlight (RH) to ON and OFF states.

Operation of a DRL system in an embodiment of the present invention structured as in the above will now be described.

If the ignition switch is ON and a dimmer switch is selected to an OFF position, the controller 10 determines that the operating conditions for the DRL system are satisfied. The controller 10 then outputs a low signal to the base terminals of the second transistor Q2 and the fourth transistor Q4 to switch the second and fourth transistors Q2 and Q4 to OFF, and outputs a high signal to the first and third transistors Q1 and Q3 to switch the first and third transistors Q1 and Q3 to ON. Accordingly, the right headlight (RH) and the left headlight (LH) turn on.

At this time, a closed loop is made with the battery (BATT), the first transistor Q1, the left headlight (LH), the third transistor Q3, the right headlight (RH), and ground (in this sequence). The current available to each headlight from the battery (BATT) is reduced by one half as a result of the internal resistance of the right headlight (RH) and the left headlight (LH). That is, the output current available to each headlight is reduced to one half of what it would be if only one of the two headlights were in the loop. As a result of the reduction in current, the left headlight (LH) and the right headlight (RH) illuminate at a high beam intensity that is reduced to a specific level (i.e., a DRL level), which is less than the normal intensity.

In this state of the high beams of the left and right headlights (LH and RH) operating at a DRL intensity, if the user selects the dimmer switch of the combination switch to an ON position (i.e., to high beam), the controller 10 determines that conditions for illumination of the left and right headlights (LH and RH) in their regular high beam mode are satisfied. Accordingly, the controller 10 outputs a high signal to the base terminals of the first transistor Q1, the second transistor Q2, and the fourth transistor Q4 such that the same are controlled to ON, and outputs a low signal to the third transistor Q3 to control the same to OFF.

Accordingly, a closed loop is made with the battery (BATT), the first transistor Q1, the left headlight (LH), the second transistor Q2, and ground (in this sequence) such that normal output current of the battery (BATT) is applied to the left headlight (LH), and the left headlight (LH) shines in the normal high beam state. Also, another closed loop is made with the battery (BATT), the fourth transistor Q4, the right headlight (RH), and ground (in this sequence) such that normal output current of the battery (BATT) is applied to the right headlight (RH), and the right headlight (RH) also illuminates in the normal high beam state.

In summary, if the DRL conditions are met, the current available to each headlight is reduced to one half of what it would be if separate circuits were made with each of the headlights, and if the dimmer switch is selected to high beam, an independent loop is made with each headlight such that the current is not reduced.

In the DRL control system of the present invention described above, if the combination switch is set to activate the DRL system when the ignition switch is ON, a closed loop is formed with both headlights, and the current available to each headlight is reduced to one half of what it would be if a loop were made independently for each of the headlights. When the dimmer switch is selected to high beam, a separate loop is made with each headlight so that a normal amount of current is available to the headlights. Accordingly, the layout of the DRL system is simplified and the problem of heat generation with the use of resistors to limit current is not encountered, thereby minimizing costs and avoiding damage to elements in and around the DRL system.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A control system for daytime running lights in a vehicle equipped with an ignition switch, said system comprising:
    a combination dimmer switch for selecting headlight mode, at least one being daytime running lights (DRL);
    a controller communication with the ignition switch and the dimmer switch, and controlling headlights according to whether the ignition switch is ON and according to a dimmer switch mode signal; and a plurality of switches communicating with the controller and switching power to the headlights according to signals from the controller to reduce headlight intensity in DRL mode, wherein the plurality of switches comprise:
- a first transistor, a collector terminal of the first transistor being connected to a battery, an emitter terminal of the first transistor being connected to a first of two terminals of a left headlight, and a base terminal of the first transistor being connected to the controller;
- a second transistor, a collector terminal of the second transistor being connected to a second terminal of the left headlight, an emitter terminal of the second transistor being grounded, and a base terminal of the second transistor being connected to the controller;
- a third transistor, a collector terminal of the third transistor being connected to the second terminal of the left headlight, an emitter terminal of the third transistor being connected to a first of two terminals of a right headlight (a second terminal of the right headlight being grounded), and a base terminal of the third transistor being connected to the controller; and
- a fourth transistor, a collector terminal of the fourth transistor being connected to the battery, an emitter terminal of the fourth transistor being connected to the first terminal of the right headlight, and a base terminal of the fourth transistor being connected to the controller.

2. The control system of claim 1, wherein the controller, if it determines that DRL operational conditions are satisfied, forms a closed loop with the battery, the first transistor, the left headlight, the third transistor, the right headlight, and ground (in this sequence) such that a current available to each headlight from the battery is reduced by half as a result of the internal resistance of each headlight.

3. The control system of claim 1, wherein the controller, if it determines that conditions for operating high beams are satisfied, forms an independent loop with the battery, the first transistor, the left headlight, the second transistor, and ground (in this sequence); and another independent loop with the battery, the fourth transistor, the right headlight, and ground (in this sequence), thereby supplying a current that is not reduced to the left and right headlights.

4. A control system for daytime running lights, comprising:

a controller receiving ignition switch ON/OFF signals and dimmer switch ON/OFF signals, and controlling illumination intensity of left and right headlights according to the received signals; and a switch unit connected to a battery, the left and right headlights, and the controller, the switch unit varying a current supplied to the left and right headlights from the battery according to control signals output from the controller, wherein the switch unit comprises:
- a first transistor, a collector terminal of the first transistor being connected to the battery, an emitter terminal of the first transistor being connected to a first of two terminals of the left headlight, and a base terminal of the first transistor being connected to the controller;
- a second transistor, a collector terminal of the second transistor being connected to a second terminal of the left headlight, an emitter terminal of the second transistor being grounded, and a base terminal of the second transistor being connected to the controller;
- a third transistor, a collector terminal of the third transistor being connected to the second terminal of the left headlight, an emitter terminal of the third transistor being connected to a first of two terminals of the right headlight (a second terminal of the right headlight being grounded), and a base terminal of the third transistor being connected to the controller; and
- a fourth transistor, a collector terminal of the fourth transistor being connected to the battery, an emitter terminal of the fourth transistor being connected to the first terminal of the right headlight, and a base terminal of the fourth transistor being connected to the controller.

5. The control system of claim 4, wherein if an ignition switch ON signal and a dimmer switch OFF signal are input to the controller, the controller performs control to operate the first transistor and the third transistor to ON, and the second transistor and the fourth transistor to OFF.

6. The control system of claim 4, wherein if an ignition switch ON signal and a dimmer switch.

* * * * *